(12) United States Patent
Chesser et al.

(10) Patent No.: US 6,403,537 B1
(45) Date of Patent: Jun. 11, 2002

(54) DRILLING FLUID SYSTEMS WITH IMPROVED FLUID LOSS PROPERTIES

(75) Inventors: Billy G. Chesser, Onalaska; Charles Perricone, Montgomery; George W. Bettge, Houston, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/435,386

(22) Filed: Nov. 5, 1999

Related U.S. Application Data
(60) Provisional application No. 60/107,487, filed on Nov. 6, 1998.

(51) Int. Cl.[7] .................................................. C09K 7/02
(52) U.S. Cl. ....................................... 507/120; 507/906
(58) Field of Search .................................. 507/120, 906

(56) References Cited

U.S. PATENT DOCUMENTS

| | | | |
|---|---|---|---|
| 3,826,311 A | 7/1974 | Szabo et al. | |
| 4,366,074 A | 12/1982 | McLaughlin et al. | 252/8.55 |
| 4,395,524 A | 7/1983 | Emmons et al. | |
| 4,409,110 A | 10/1983 | Borchardt et al. | |
| 4,517,333 A | 5/1985 | Lundberg et al. | |
| 4,532,052 A | 7/1985 | Weaver et al. | 252/8.55 |
| 4,540,496 A | 9/1985 | Peiffer et al. | 252/8.55 |
| 4,547,299 A | 10/1985 | Lucas | 252/8.55 |
| 4,554,081 A * | 11/1985 | Borchardt | 507/120 |
| 4,626,363 A | 12/1986 | Gleason et al. | 252/8.55 |
| H385 H * | 12/1987 | Bol | 507/120 |
| 4,970,260 A | 11/1990 | Lundberg et al. | |
| 5,116,421 A | 5/1992 | Ganguli | 106/823 |
| 5,134,118 A | 7/1992 | Patel et al. | 507/121 |
| 5,620,947 A * | 4/1997 | Elward-Berry | 507/120 |
| 5,663,123 A | 9/1997 | Goodhue, Jr. et al. | 507/225 |
| 5,762,141 A | 6/1998 | Hutchinson et al. | 166/295 |
| 5,789,349 A | 8/1998 | Patel | 507/121 |
| 6,172,010 B1 * | 1/2001 | Argillier et al. | 507/120 |

FOREIGN PATENT DOCUMENTS

WO    WO 90/14403    11/1990

OTHER PUBLICATIONS

Borchardt, John K., "Oil Field Applications", XP–002129993 vol. 10., pp 328–396, (1993).

* cited by examiner

*Primary Examiner*—Philip Tucker
(74) *Attorney, Agent, or Firm*—Paula D. Morris & Associates P.C.

(57) ABSTRACT

A drilling fluid system comprising a brine and a quantity of cationic copolymers comprising a ratio of acrylamide monomers to cationic derivatives of acrylamide monomers, wherein the quantity and the ratio are effective to maintain effective rheology and fluid loss control in said drilling fluid system at temperatures of at least about 250° C. for at least about 16 hours.

190 Claims, No Drawings

DRILLING FLUID SYSTEMS WITH IMPROVED FLUID LOSS PROPERTIES

This application claims benefit of Provisional Appln. No. 60/107,487 filed Nov. 6, 1998.

FIELD OF THE INVENTION

The present invention relates to brine based drilling fluid system with improved fluid loss control properties at high temperatures provided by cationic polymers.

BACKGROUND OF THE INVENTION

Filtration control is one of the most important properties of a drilling fluid, particularly when drilling through permeable formations where the hydrostatic pressure exceeds the formation pressure. It is important for a drilling fluid to quickly form a filter cake which effectively minimizes fluid loss, but which also is thin and dispersible enough to allow product to flow into the wellbore during production.

Filtration control additives for brines typically are non-ionic water soluble polymers, such as starches, derivatized starches, gums, derivatized gums, and cellulosics. These polymers have certain advantages, but suffer from the disadvantage that they have a relatively low hydration rate in brines—particularly in high density brines, where very little water actually is available to hydrate and swell the polymers.

Another disadvantage of nonionic water-soluble polymers is that they have limited temperature stability. As wells are drilled deeper, higher bottomhole tempt are encountered. Today's drilling fluids need to maintain stable rheology and low filtration at temperatures above 300° F. Unfortunately, the nonionic water soluble polymers currently in use are not stable at exceeding about 225° F. with extended aging times.

Filtration control additives are needed which will quickly form a thin, dispersible filter cake, and which also have high temperature stability for prolonged period of time.

SUMMARY OF THE INVENTION

The present invention provides a drilling fluid system comprising a brine comprising a quantity of cationic copolymer comprising a ratio of acrylamide monomers to cationic derivatives of acrylamide monomers, wherein the quantity and the ratio are effective to maintain effective rheology and fluid loss control in the drilling fluid system at temperatures of at least about 250° F. for at east about 16 hours.

DETAILED DESCRIPTION OF THE INVENTION

The present invention provides a drilling fluid system, preferably for use as a drill-in or completion fluid, which quickly forms a thin, dispersable filter cake and which is stable for prolonged periods of time at high temperatures.

The drilling fluid system comprises an aqueous brine, preferably a "high density brine" (defined below), a viscosifier, a bridging agent, a pH stabilizer, and one or more fluid loss control additive(s). A preferred fluid loss control additive comprises cationic copolymers.

The cationic copolymers of the present invention may be used as an additive in substantially any aqueous brine drilling fluid system. However, not all types of drilling fluid systems encounter extremely high temperatures. Because of this, a preferred use for the drilling fluid system of the present invention is as a drill-in or completion fluid—fluids which are more likely to be exposed to higher downhole temperatures for prolonged periods of time.

Preferred drill-in and completion fluids are brines having a density of at east about 9 lb/gal, most preferably "high density brines," defined herein to mean brines having a density of at least about 12–17 lb/gal. The brines may contain substantially any suitable salts, including, but not necessarily lifted to salts based on metals, such as calcium, magnesium, sodium, potassium, cesium, zinc, aluminum, and lithium. Salts of calcium and zinc are preferred. The salts may contain substantially any anions, with preferred anions being less expensive anions including, but not necessarily limited to chlorides, bromides, formates, acetates, and nitrates. Most preferred salts are calcium bromide and zinc bromide.

For purposes of the present invention, the term "cationic copolymers" is defined to refer to cationic copolymers which provide effective rheology and filtration control at temperatures greater than about 250° F., preferably about 300° F., most preferably about 325° F., for about 16 hours, preferably for about 48 hours or more. For purposes of the present application, effective rheology is defined to mean structure which is sufficient to suspend bridging agents but not excessive so as to cause high equivalent circulating densities. Effective filtration control is defined to mean control which provides a low filtration rate with a thin, dispersable filter cake.

Preferred cationc copolymr include, but are not necessarily limited to copolymers comprising, and preferably consisting essentially of monomers of acrylamide and monomers of a cationic derivative of acrylamide. Preferred cationic derivatives of acrylamide for use in such copolymers are quaternary salts of N,N-dialkylaminoacrylamide wherein the size of the alkyl groups is limited by solubility to about 5, preferably about 4, most preferably about 1–3 carbon atoms. A preferred cationic quaternary salt is quaternary methyl N,N-dimethylaminoethylmethacrylamide. The copolymers preferably comprise a ratio of from about 3:1 to about 1:1 of the cationic monomer.

Cationic copolymers suitable for use in the present invention are commercially available from Fritz Industries, Inc., Dallas, Tex., under the name EXP-8 EMULSION POLYMER. In order to achieve the desired rheological and filtration control, the fluid should contain from about 1 lb/bbl to about 10 lb/bbl of a 35% active solution of the cationic copolymer in a suitable carrier, such as oil, which translates to about 0.35 to about 3.5 lb/bbl active cationic copolymer.

The cationic copolymers can be used alone or used in conjunction with a different type of fluid loss additive, preferably a 2-amino-2-methyl propane sulfonic acid (AMPS) additive, such as KEM SEAL PLUSH®, available from Baker Hughes INTEQ. Where a combination of cationic copolymer and another fluid loss additive is used, the ratio of cationic copolymer to the other fluid loss additive preferably is about 2:1 to about 1:2, most preferably about 1:1.

The system preferably includes bridging agents to bridge the pores in the formation. Suitable bridging agents include, but are not necessarily limited to ground marble or calcium carbonate particles, such as MIL-CARB®, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, about 50 pounds should be used per barrel of brine.

The system also preferably includes a viscosifier, such as SALT WATER GEL®, available from Baker-Hughes INTEQ, Houston, Tex. A preferred viscosifier is EXP-77, a cellulosic blend, also available from Baker Hughes INTEQ.

Finally, the system includes a suitable material for adjusting the pH of the system to from about 9 to about 10. Suitable materials include, but are not necessarily limited to hydrous oxides of divalent cations. A preferred material is MgO.

A preferred basic formulation for a drilling fluid system according to the present invention is given in the following table:

| Component/Product | Quantity |
|---|---|
| Brine (12–17 lb/gal density) | 38–39 gal |
| EXP-77 | 5–15 lb/bbl |
| MIL-CARB ® | 50 lb/bbl |
| MgO | 3–5 lb/bbl |
| Cationic Copolymer (35% active) | 1–10 lb/bbl |
| KEM SEAL PLUS ® | 0–4 lb/bbl |

The invention will be more clearly understood with reference to the following examples, which are illustrative only and should not be construed as limiting the present invention.

EXAMPLE I

Tests were conducted to determine fluid properties of two fluids having the following compositions:

|  | CONCENTRATION (g) | |
|---|---|---|
| COMPONENT | Fluid 1 | Fluid 2 |
| $CaCl_2/CaBr_2$ Brine (13.5 lb/gal density) | 510.5 | 508 |
| EXP-77 | 10 | 10 |
| MIL-CARB ® | 50 | 50 |
| MgO | 3 | 3 |
| Cationic Copolymer (35% active) | 5.7 | 5.7 |
| KEM SEAL PLUS ® | — | 2 |

In order to prepare the fluids, the brine was placed in a 1000 ml. beaker and a Silverson L4RT Mixer shaft with a small hole sleeve was inserted. The speed of the mixer was adjusted to 7000 rpm. The EXP-77 was added to the brine and the fluid was mixed for 5 minutes. The MIL-CARB® and MgO were added, and mixing was continued for 5 minutes at 5000 rpm The cationic copolymer then was added, and the resulting fluid was mixed at 5000 rpm for another 5 minutes. Rheology tests were run immediately. The fluids exhibited the following properties:

| | Properties | | | |
|---|---|---|---|---|
| | Fluid 1 | | Fluid 2 | |
| Fann 35 @ 120° F. | Initial | After Hot Rolling 16 hr @ 325' F. | Initial | After Hot Rolling 16 hr @ 325° F. |
| Fann 600 rpm | 155 | 117 | 148 | 114 |
| Fann 300 rpm | 87.5 | 64 | 83.5 | 63 |
| Fann 200 rpm | 62.5 | 48.5 | 60 | 48 |
| Fann 100 rpm | 35 | 31.5 | 33.5 | 32 |
| Fann 6 rpm | 3.5 | 10 | 3 | 10.5 |
| Fann 3 rpm | 2.5 | 8.5 | 2.5 | 9.5 |
| pH (10% disp.) | 9.3 | 9.3 | 9.1 | 9.4 |
| API Fluid Loss, ml. | 0.0 | | 0.0 | |
| HTHP Fluid Loss, ml. × 2* | | 16.0 | | 10.0 |

*325° F., 500 psi, 0.5 hr, paper disc

Fluid loss values measured for both of the foregoing fluids were less than the values typically achievable using biopolymers. Because the fluid containing KEM-SEAL PLUS® achieved a fluid loss of only 10.0 ml., it was concluded that a preferred system is a combination of the cationic copolymer and KEMSEAL PLUS®.

EXAMPLE II

Tests were conducted on a fluid having the following composition to determine fluid properties:

| COMPONENT | CONCENTRATION (g) |
|---|---|
| $CaCl_2/CaBr_2$ Brine (13.5 lb/gal density) | 508 |
| EXP-77 | 10 |
| MIL-CARB ® | 50 |
| MgO | 3 |
| Cationic Copolymer (35% active) | 5.7 |
| KEM SEAL PLUS ® | 2 |

The fluid exhibited the following properties:

| | Properties | | |
|---|---|---|---|
| Fann 35 @ 120° F. | Initial | After Hot Rolling 16 hrs @ 325° F. | After Hot Rolling 48 hrs @325° F. |
| Fann 600 rpm | 148 | 114 | 98 |
| Fann 300 rpm | 83.5 | 63 | 62 |
| Fann 200 rpm | 60 | 48 | 47 |
| Fann 100 rpm | 33.5 | 32 | 32 |
| Fann 6 rpm | 3 | 10.5 | 10.5 |
| Fann 3 rpm | 2.5 | 8.5 | 9 |
| pH (10% disp.) | | 9.4 | 8.9 |
| API Fluid Loss, ml. | 0.0 | | |
| HTHP Fluid Loss, ml. × 2* | | 10.0 | 14.8 |

*325° F., 500 psi, 0.5 hr, paper disc

The combination of cationic copolymers with KEM SEAL PLUS® was tested after hot rolling for 16 hours, and after hot rolling for 48 hours. A 10.0 ml. fluid loss was obtained at 16 hours, increasing to 14.8 ml. after 48 hours. Both fluid loss values are better than those achievable using biopolymers as filtration control additives under similar conditions.

Many modifications and variations may be made to the embodiments described herein without departing from the spirit of the present invention. The embodiments described herein are illustrative only should not be construed as limiting the scope of the present invention.

We claim:

1. A drilling fluid system comprising:
a brine comprising an amount of at least one bridging agent and a quantity of cationic copolymer comprising a first ratio of acrylamide monomers to cationic derivatives of acrylamide monomers comprising quaternary salts of N,N-dialkylaminoacrylamide,
wherein said quantity of said cationic polymer and said amount of said bridging agent are effective to form a filter cake which provides effective filtration control and rheology in said drilling fluid system at temperatures of at least about 250° F. for at least about 16 hours.

2. A drilling fluid system comprising:
a brine comprising a viscosifier, a density of about 9 lb/gal or greater, an amount of at least one bridging agent, and a quantity of cationic copolymer comprising a first ratio of acrylamide monomers to cationic derivatives of acrylamide monomers comprising quaternary salts of N,N-dialkylaminoacrylamide;
wherein said quantity of said cationic polymer and said amount of said bridging agent are effective to form a filter cake which provides effective filtration control and rheology in said drilling fluid system at temperatures of at least about 250° F. for at least about 16 hours.

3. A drilling fluid system comprising a brine comprising an amount of at least one bridging agent and about 0.35 to about 3.5 lb/bbl of active cationic copolymer comprising a first ratio of acrylamide monomers to cationic derivatives of said acrylamide monomers of from about 3:1 to about 1:1, wherein said cationic derivatives of said acrylamide monomers comprise quaternary salts of N,N-dialkylaminoacrylamide.

4. A drilling fluid system comprising a brine comprising a viscosifier, a density of about 9 lb/gal or greater, an amount of at least one bridging agent, and a quantity of cationic copolymer comprising a first ratio of acrylamide monomers to cationic derivatives of acrylamide monomers comprising quaternary salts of N,N-dialkylaminoacrylamide.

5. A drilling fluid system comprising:
a brine comprising an amount of at least one bridging agent and a quantity of cationic copolymer comprising a first ratio of acrylamide monomers to cationic derivatives of acrylamide monomers comprising quaternary alkyl salts of N,N-dialkylaminoalkylmethacrylamide;
wherein said quantity of said cationic polymer and said amount of said bridging agent are effective to form a filter cake which provides effective filtration control and rheology in said drilling fluid system at temperatures of at least about 250° F. for at least about 16 hours.

6. A drilling fluid system comprising:
a brine comprising a viscosifier, a density of about 9 lb/gal or greater, an amount of at least one bridging agent, and a quantity of cationic copolymer comprising a first ratio of acrylamide monomers to cationic derivatives of acrylamide monomers comprising quaternary alkyl salts of N,N-dialkylaminoalkylmethacrylamide;
wherein said quantity of said cationic polymer and said amount of said bridging agent are effective to form a filter cake which provides effective filtration control and rheology in said drilling fluid system at temperatures of at least about 250° F. for at least about 16 hours.

7. A drilling fluid system comprising a brine comprising an amount of at least one bridging agent and about 0.35 to about 3.5 lb/bbl of active cationic copolymer comprising a first ratio of acrylamide monomers to cationic derivatives of said acrylamide monomers of from about 3:1 to about 1:1, wherein said cationic derivatives of said acrylamide monomers comprise quaternary alkyl salts of N,N-dialkylamino alkylmethacrylamide.

8. The drilling fluid system of claim 4 wherein said quarternary salts comprise quaternary alkyl salts of N,N-dialkylaminoalkylmethacrylamide.

9. A drilling fluid system comprising:
a brine comprising an amount of at least one bridging agent and a quantity of cationic copolymer comprising a first ratio of acrylamide monomers to cationic derivatives of acrylamide monomers comprising quaternary methyl N,N-dimethylaminoethylmethacrylamide;
wherein said quantity of said cationic polymer and said amount of said bridging agent are effective to form a filter cake which provides effective filtration control and rheology in said drilling fluid system at temperatures of at least about 250° F. for at least about 16 hours.

10. A drilling fluid system comprising:
a brine comprising a viscosifier, and a density of about 9 lb/gal or greater, and an amount of at least one bridging agent and a quantity of cationic copolymer comprising a first ratio of acrylamide monomers to cationic derivatives of acrylamide monomers comprising quaternary methyl N,N-dimethylaminoethylmethacrylamide;
wherein said quantity of said cationic polymer and said amount of said bridging agent are effective to form a filter cake which provides effective filtration control and rheology in said drilling fluid system at temperatures of at least about 250° F. for at least about 16 hours.

11. The drilling fluid system of claim 5 wherein said quaternary salts comprise quaternary methyl N,N-dimethylaminoethylmethacrylamide.

12. A drilling fluid system comprising a brine comprising an amount of at least one bridging agent and about 0.35 to about 3.5 lb/bbl of active cationic copolymer comprising a first ratio of acrylamide monomers to quaternary methyl N,N-dimethylaminoethylmethacrylamide monomers of from about 3:1 to about 1:1.

13. The drilling fluid system of claim 1 wherein said first ratio is from about 3:1 to about 1:1.

14. The drilling fluid system of claim 2 wherein said first ratio is from about 3:1 to about 1:1.

15. The drilling fluid system of claim 4 wherein said first ratio is from about 3:1 to about 1:1.

16. The drilling fluid system of claim 1 wherein
said brine comprises a density of about 9.0 lb/gal or greater; and,
said brine further comprises a fluid loss control additive comprising 2-amino-2-methyl propane sulfonic acid.

17. The drilling fluid system of claim 16 wherein said cationic polymer and said fluid loss control additive are present in said drilling fluid system at a second ratio of from about 2:1 to about 1:2.

18. The drilling fluid system of claim 16 wherein said cationic polymer and said fluid loss control additive are present in said drilling fluid system at a second ratio of about 1:1.

19. The drilling fluid system of claim 12 wherein
said brine comprises a density of about 9.0 lb/gal or greater; and,
said brine further comprises a fluid loss control additive comprising 2-amino-2-methyl propane sulfonic acid.

20. The drilling fluid system of claim 19 wherein said cationic polymer and said fluid loss control additive are present in said drilling fluid system at a second ratio of from about 2:1 to about 1:2.

21. The drilling fluid system of claim 19 wherein said cationic polymer and said fluid loss control additive are present in said drilling fluid system at a second ratio of about 1:1.

22. The drilling fluid system of claim 12 wherein said brine has a density of at least about 9 lb/gal.

23. The drilling fluid system of claim 1 wherein said brine has a density of from about 12 to about 17 lb/gal.

24. The drilling fluid system of claim 2 wherein said brine has a density of from about 12 to about 17 lb/gal.

25. The drilling fluid system of claim 12 wherein said brine has a density of from about 12 to about 17 lb/gal.

26. A method comprising adding to a drilling fluid system comprising a brine and an amount of at least one bridging agent, a quantity of cationic copolymers comprising a first ratio of acrylamide monomers to cationic derivatives of acrylamide monomers comprising quaternary salts of N,N-dialkylaminoacrylamide, wherein said quantity of said cationic polymer and said amount of said bridging agent are effective to form a filter cake which provides effective filtration control and maintains effective rheology in said drilling fluid system at temperatures of at least about 250° F. for at least about 16 hours.

27. The method of claim 26 wherein said drilling fluid system comprises
 a viscosifier; and
 a density of about 9 lb/gal or greater.

28. A method for treating a drilling fluid system comprising a brine to control fluid loss properties comprising adding to said drilling fluid system about 0.35 to about 3.5 lb/bbl of active cationic copolymer comprising quaternary salts of N,N-dialkylaminoacrylamide and comprising a first ratio of acrylamide monomers to cationic derivatives of said acrylamide monomers of from about 3:1 to about 1:1 and an amount of at least one bridging agent, said first ratio of monomers to cationic derivatives and said amount of said bridging agent being effective to form a filter cake.

29. A method comprising adding to a drilling fluid system comprising a brine and an amount of at least one bridging agent, a quantity of cationic copolymers comprising a first ratio of acrylamide monomers to cationic derivatives of acrylamide monomers, wherein said quantity of said cationic polymer and said amount of said bridging agent are effective to form a filter cake which provides effective filtration control and maintains effective rheology in said drilling fluid system at temperatures of at least about 250° F. for at least about 16 hours, wherein said quaternary salts comprise quaternary alkyl salts of N,N-dialkylaminoalkylmethacrylamide.

30. The method of claim 27 wherein said quarternary salts comprise quaternary alkyl salts of N,N-dialkylaminoalkylmethacrylamide.

31. The method of claim 28 wherein said quarternary salts comprise quaternary alkyl salts of N,N-dialkylaminoalkylmethacrylamide.

32. A method for treating a drilling fluid system comprising a brine and an amount of at least one bridging agent to control fluid loss properties comprising adding to said drilling fluid system from about 0.35 to about 3.5 lb/bbl of cationic copolymer comprising a first ratio of acrylamide monomers to quaternary methyl N,N-dimethylaminoethylmethacrylamide monomers of from about 3:1 to about 1:1, said first ratio of acrylamide monomers to quaternary methyl N,N-dimethylaminoethylmethacrylamide monomers and said integral amount of solid particles being effective to form a filter cake.

33. The method of claim 26 wherein
 said brine comprises a density of about 9 lb/gal or greater; and,
 said method further comprises adding to said drilling fluid system a portion of a fluid loss control additive comprising 2-amino-2-methyl propane sulfonic acid which is effective to reduce fluid loss in said drilling fluid system to an amount less than fluid loss achieved using said cationic copolymer, alone.

34. The method of claim 33 wherein said quantity of said cationic copolymer is at a second ratio of from about 2:1 to about 1:2 to said amount of said fluid loss control additive.

35. The method of claim 33 wherein said quantity of said cationic copolymer is at a second ratio of about 1:1 to said amount of said fluid loss control additive.

36. The method of claim 32 where
 said brine comprises a density of about 9 lb/gal or greater; and,
 said method further comprises adding to said drilling fluid system a portion of a fluid loss control additive comprising 2-amino-2-methyl propane sulfonic acid which is effective to reduce fluid loss in said drilling fluid system to an amount less than fluid loss achieved using said cationic copolymer, alone.

37. The method of claim 36 wherein said quantity of said cationic copolymer is at a second ratio of from about 2:1 to about 1:2 to said amount of said fluid loss control additive.

38. The method of claim 36 wherein said quantity of said cationic copolymer is at a second ratio of about 1:1 to said amount of said fluid loss control additive.

39. The method of claim 32 wherein said brine has a density of at least about 9 lb/gal.

40. The method of claim 32 wherein said brine has a density of from about 12 to about 17 lb/gal.

41. A drilling fluid system comprising a brine comprising an amount of at least one bridging agent and about 0.35 to about 3.5 lb/bbl of active cationic copolymer comprising a first ratio of acrylamide monomers to cationic derivatives of said acrylamide monomers of from about 3:1 to about 1:1, wherein said cationic derivatives of said acrylamide monomers comprise quaternary salts of N,N-dialkylaminoacrylamide, wherein said quantity of said cationic polymer and said amount of said bridging agent are effective to form a filter cake which provides effective filtration control.

42. The method of claim 27 wherein said first ratio is from about 3:1 to about 1:1.

43. The method of claim 26 wherein said first ratio is from about 3:1 to about 1:1.

44. The method of claim 29 wherein said first ratio is from about 3:1 to about 1:1.

45. The method of claim 30 wherein said first ratio is from about 3:1 to about 1:1.

46. The method of claim 33 wherein said first ratio is from about 3:1 to about 1:1.

47. The method of claim 34 wherein said first ratio is from about 3:1 to about 1:1.

48. The method of claim 35 wherein said first ratio is from about 3:1 to about 1:1.

49. The method of claim 36 wherein said first ratio is from about 3:1 to about 1:1.

50. The method of claim 37 wherein said first ratio is from about 3:1 to about 1:1.

51. The method of claim 38 wherein said first ratio is from about 3:1 to about 1:1.

52. The method of claim 28 wherein said drilling fluid system comprises a density of about 9 lb/gal or greater.

53. The method of claim 31 wherein said drilling fluid system comprises a density of about 9 lb/gal or greater.

54. The method of claim 32 wherein said drilling fluid system comprises a density of about 9 lb/gal or greater.

55. The method of claim 42 wherein said drilling fluid system comprises a density of about 9 lb/gal or greater.

56. The method of claim 44 wherein said drilling fluid system comprises a density of about 9 lb/gal or greater.

57. The method of claim 46 wherein said drilling fluid system comprises a density of about 9 lb/gal or greater.

58. The method of claim 27 wherein said brine has a density of from about 12 to about 17 lb/gal.

59. The method of claim 29 wherein said brine has a density of from about 12 to about 17 lb/gal.

60. The method of claim 30 wherein said brine has a density of from about 12 to about 17 lb/gal.

61. The method of claim 31 wherein said brine has a density of from about 12 to about 17 lb/gal.

62. The method of claim 33 wherein said brine has a density of from about 12 to about 17 lb/gal.

63. The method of claim 34 wherein said brine has a density of from about 12 to about 17 lb/gal.

64. The method of claim 35 wherein said brine has a density of from about 12 to about 17 lb/gal.

65. The method of claim 36 wherein said brine has a density of from about 12 to about 17 lb/gal.

66. The method of claim 37 wherein said brine has a density of from about 12 to about 17 lb/gal.

67. The method of claim 38 wherein said brine has a density of from about 12 to about 17 lb/gal.

68. The drilling fluid system of claim 5 wherein said first ratio is from about 3:1 to about 1:1.

69. The drilling fluid system of claim 6 wherein said first ratio is from about 3:1 to about 1:1.

70. The drilling fluid system of claim 8 wherein said first ratio is from about 3:1 to about 1:1.

71. The drilling fluid system of claim 9 wherein said first ratio is from about 3:1 to about 1:1.

72. The drilling fluid system of claim 10 wherein said first ratio is from about 3:1 to about 1:1.

73. The drilling fluid system of claim 11 wherein said first ratio is from about 3:1 to about 1:1.

74. The drilling fluid system of claim 16 wherein said first ratio is from about 3:1 to about 1:1.

75. The drilling fluid system of claim 17 wherein said first ratio is from about 3:1 to about 1:1.

76. The drilling fluid system of claim 18 wherein said first ratio is from about 3:1 to about 1:1.

77. The drilling fluid system of claim 19 wherein said first ratio is from about 3:1 to about 1:1.

78. The drilling fluid system of claim 20 wherein said first ratio is from about 3:1 to about 1:1.

79. The drilling fluid system of claim 21 wherein said first ratio is from about 3:1 to about 1:1.

80. The drilling fluid system of claim 22 wherein said first ratio is from about 3:1 to about 1:1.

81. The drilling fluid system of claim 23 wherein said first ratio is from about 3:1 to about 1:1.

82. The drilling fluid system of claim 24 wherein said first ratio is from about 3:1 to about 1:1.

83. The drilling fluid system of claim 25 wherein said first ratio is from about 3:1 to about 1:1.

84. The drilling fluid system of claim 3 wherein said brine further comprises a fluid loss control additive comprising 2-amino-2-methyl propane sulfonic acid.

85. The drilling fluid system of claim 84 wherein said cationic polymer and said fluid loss control additive are present in said drilling fluid system at a second ratio of from about 2:1 to about 1:2.

86. The drilling fluid system of claim 84 wherein said cationic polymer and said fluid loss control additive are present in said drilling fluid system at a second ratio of about 1:1.

87. The drilling fluid system of claim 4 wherein said brine further comprises a fluid loss control additive comprising 2-amino-2-methyl propane sulfonic acid.

88. The drilling fluid system of claim 87 wherein said cationic polymer and said fluid loss control additive are present in said drilling fluid system at a second ratio of from about 2:1 to about 1:2.

89. The drilling fluid system of claim 87 wherein said cationic polymer and said fluid loss control additive are present in said drilling fluid system at a second ratio of about 1:1.

90. The drilling fluid system of claim 5 wherein said brine further comprises a fluid loss control additive comprising 2-amino-2-methyl propane sulfonic acid.

91. The drilling fluid system of claim 90 wherein said cationic polymer and said fluid loss control additive are present in said drilling fluid system at a second ratio of from about 2:1 to about 1:2.

92. The drilling fluid system of claim 90 wherein said cationic polymer and said fluid loss control additive are present in said drilling fluid system at a second ratio of about 1:1.

93. The drilling fluid system of claim 6 wherein said brine further comprises a fluid loss control additive comprising 2-amino-2-methyl propane sulfonic acid.

94. The drilling fluid system of claim 93 wherein said cationic polymer and said fluid loss control additive are present in said drilling fluid system at a second ratio of from about 2:1 to about 1:2.

95. The drilling fluid system of claim 93 wherein said cationic polymer and said fluid loss control additive are present in said drilling fluid system at a second ratio of about 1:1.

96. The drilling fluid system of claim 6 wherein said brine further comprises a fluid loss control additive comprising 2-amino-2-methyl propane sulfonic acid.

97. The drilling fluid system of claim 96 wherein said cationic polymer and said fluid loss control additive are present in said drilling fluid system at a second ratio of from about 2:1 to about 1:2.

98. The drilling fluid system of claim 96 wherein said cationic polymer and said fluid loss control additive are present in said drilling fluid system at a second ratio of about 1:1.

99. The drilling fluid system of claim 8 wherein said brine further comprises a fluid loss control additive comprising 2-amino-2-methyl propane sulfonic acid.

100. The drilling fluid system of claim 99 wherein said cationic polymer and said fluid loss control additive are present in said drilling fluid system at a second ratio of from about 2:1 to about 1:2.

101. The drilling fluid system of claim 99 wherein said cationic polymer and said fluid loss control additive are present in said drilling fluid system at a second ratio of about 1:1.

102. The drilling fluid system of claim 9 wherein said brine further comprises a fluid loss control additive comprising 2-amino-2-methyl propane sulfonic acid.

103. The drilling fluid system of claim 102 wherein said cationic polymer and said fluid loss control additive are present in said drilling fluid system at a second ratio of from about 2:1 to about 1:2.

104. The drilling fluid system of claim 102 wherein said cationic polymer and said fluid loss control additive are present in said drilling fluid system at a second ratio of about 1:1.

105. The drilling fluid system of claim 10 wherein said brine further comprises a fluid loss control additive comprising 2-amino-2-methyl propane sulfonic acid.

106. The drilling fluid system of claim 105 wherein said cationic polymer and said fluid loss control additive are present in said drilling fluid system at a second ratio of from about 2:1 to about 1:2.

107. The drilling fluid system of claim 105 wherein said cationic polymer and said fluid loss control additive are present in said drilling fluid system at a second ratio of about 1:1.

108. The drilling fluid system of claim 11 wherein said brine further comprises a fluid loss control additive comprising 2-amino-2-methyl propane sulfonic acid.

109. The drilling fluid system of claim 108 wherein said cationic polymer and said fluid loss control additive are present in said drilling fluid system at a second ratio of from about 2:1 to about 1:2.

110. The drilling fluid system of claim 108 wherein said cationic polymer and said fluid loss control additive are present in said drilling fluid system at a second ratio of about 1:1.

111. The drilling fluid system of claim 12 wherein said brine further comprises a fluid loss control additive comprising 2-amino-2-methyl propane sulfonic acid.

112. The drilling fluid system of claim 111 wherein said cationic polymer and said fluid loss control additive are present in said drilling fluid system at a second ratio of from about 2:1 to about 1:2.

113. The drilling fluid system of claim 111 wherein said cationic polymer and said fluid loss control additive are present in said drilling fluid system at a second ratio of about 1:1.

114. The drilling fluid system of claim 13 wherein said brine further comprises a fluid loss control additive comprising 2-amino-2-methyl propane sulfonic acid.

115. The drilling fluid system of claim 114 wherein said cationic polymer and said fluid loss control additive are present in said drilling fluid system at a second ratio of from about 2:1 to about 1:2.

116. The drilling fluid system of claim 114 wherein said cationic polymer and said fluid loss control additive are present in said drilling fluid system at a second ratio of about 1:1.

117. The drilling fluid system of claim 14 wherein said brine further comprises a fluid loss control additive comprising 2-amino-2-methyl propane sulfonic acid.

118. The drilling fluid system of claim 117 wherein said cationic polymer and said fluid loss control additive are present in said drilling fluid system at a second ratio of from about 2:1 to about 1:2.

119. The drilling fluid system of claim 117 wherein said cationic polymer and said fluid loss control additive are present in said drilling fluid system at a second ratio of about 1:1.

120. The drilling fluid system of claim 15 wherein said brine further comprises a fluid loss control additive comprising 2-amino-2-methyl propane sulfonic acid.

121. The drilling fluid system of claim 120 wherein said cationic polymer and said fluid loss control additive are present in said drilling fluid system at a second ratio of from about 2:1 to about 1:2.

122. The drilling fluid system of claim 120 wherein said cationic polymer and said fluid loss control additive are present in said drilling fluid system at a second ratio of about 1:1.

123. The drilling fluid system of claim 22 wherein said brine further comprises a fluid loss control additive comprising 2-amino-2-methyl propane sulfonic acid.

124. The drilling fluid system of claim 123 wherein said cationic polymer and said fluid loss control additive are present in said drilling fluid system at a second ratio of from about 2:1 to about 1:2.

125. The drilling fluid system of claim 123 wherein said cationic polymer and said fluid loss control additive are present in said drilling fluid system at a second ratio of about 1:1.

126. The drilling fluid system of claim 23 wherein said brine further comprises a fluid loss control additive comprising 2-amino-2-methyl propane sulfonic acid.

127. The drilling fluid system of claim 126 wherein said cationic polymer and said fluid loss control additive are present in said drilling fluid system at a second ratio of from about 2:1 to about 1:2.

128. The drilling fluid system of claim 126 wherein said cationic polymer and said fluid loss control additive are present in said drilling fluid system at a second ratio of about 1:1.

129. The drilling fluid system of claim 24 wherein said brine further comprises a fluid loss control additive comprising 2-amino-2-methyl propane sulfonic acid.

130. The drilling fluid system of claim 129 wherein said cationic polymer and said fluid loss control additive are present in said drilling fluid system at a second ratio of from about 2:1 to about 1:2.

131. The drilling fluid system of claim 129 wherein said cationic polymer and said fluid loss control additive are present in said drilling fluid system at a second ratio of about 1:1.

132. The drilling fluid system of claim 25 wherein said brine further comprises a fluid loss control additive comprising 2-amino-2-methyl propane sulfonic acid.

133. The drilling fluid system of claim 132 wherein said cationic polymer and said fluid loss control additive are present in said drilling fluid system at a second ratio of from about 2:1 to about 1:2.

134. The drilling fluid system of claim 132 wherein said cationic polymer and said fluid loss control additive are present in said drilling fluid system at a second ratio of about 1:1.

135. The drilling fluid system of claim 3 wherein said brine has a density of at least about 9 lb/gal.

136. The drilling fluid system of claim 5 wherein said brine has a density of at least about 9 lb/gal.

137. The drilling fluid system of claim 7 wherein said brine has a density of at least about 9 lb/gal.

138. The drilling fluid system of claim 9 wherein said brine has a density of at least about 9 lb/gal.

139. The drilling fluid system of claim 12 wherein said brine has a density of at least about 9 lb/gal.

140. The drilling fluid system of claim 13 wherein said brine has a density of at least about 9 lb/gal.

141. The drilling fluid system of claim 71 wherein said brine has a density of at least about 9 lb/gal.

142. The drilling fluid system of claim 84 wherein said brine has a density of at least about 9 lb/gal.

143. The drilling fluid system of claim 90 wherein said brine has a density of at least about 9 lb/gal.

144. The drilling fluid system of claim 96 wherein said brine has a density of at least about 9 lb/gal.

145. The drilling fluid system of claim 97 wherein said brine has a density of at least about 9 lb/gal.

146. The drilling fluid system of claim 102 wherein said brine has a density of at least about 9 lb/gal.

147. The drilling fluid system of claim 111 wherein said brine has a density of at least about 9 lb/gal.

148. The drilling fluid system of claim 112 wherein said brine has a density of at least about 9 lb/gal.

149. The drilling fluid system of claim 113 wherein said brine has a density of at least about 9 lb/gal.

150. The drilling fluid system of claim 114 wherein said brine has a density of at least about 9 lb/gal.

151. The drilling fluid system of claim 115 wherein said brine has a density of at least about 9 lb/gal.

152. The drilling fluid system of claim 116 wherein said brine has a density of at least about 9 lb/gal.

153. The drilling fluid system of claim 4 wherein said brine has a density of from about 12 to about 17 lb/gal.

154. The drilling fluid system of claim 5 wherein said brine has a density of from about 12 to about 17 lb/gal.

155. The drilling fluid system of claim 6 wherein said brine has a density of from about 12 to about 17 lb/gal.

156. The drilling fluid system of claim 7 wherein said brine has a density of from about 12 to about 17 lb/gal.

157. The drilling fluid system of claim 8 wherein said brine has a density of from about 12 to about 17 lb/gal.

158. The drilling fluid system of claim 9 wherein said brine has a density of from about 12 to about 17 lb/gal.

159. The drilling fluid system of claim 10 wherein said brine has a density of from about 12 to about 17 lb/gal.

160. The drilling fluid system of claim 11 wherein said brine has a density of from about 12 to about 17 lb/gal.

161. The drilling fluid system of claim 12 wherein said brine has a density of from about 12 to about 17 lb/gal.

162. The drilling fluid system of claim 13 wherein said brine has a density of from about 12 to about 17 lb/gal.

163. The drilling fluid system of claim 14 wherein said brine has a density of from about 12 to about 17 lb/gal.

164. The drilling fluid system of claim 15 wherein said brine has a density of from about 12 to about 17 lb/gal.

165. The drilling fluid system of claim 16 wherein said brine has a density of from about 12 to about 17 lb/gal.

166. The drilling fluid system of claim 17 wherein said brine has a density of from about 12 to about 17 lb/gal.

167. The drilling fluid system of claim 18 wherein said brine has a density of from about 12 to about 17 lb/gal.

168. The drilling fluid system of claim 19 wherein said brine has a density of from about 12 to about 17 lb/gal.

169. The drilling fluid system of claim 20 wherein said brine has a density of from about 12 to about 17 lb/gal.

170. The drilling fluid system of claim 21 wherein said brine has a density of from about 12 to about 17 lb/gal.

171. The drilling fluid system of claim 22 wherein said brine has a density of from about 12 to about 17 lb/gal.

172. The method of claim 66 wherein said brine has a density of from about 12 to about 17 lb/gal.

173. The method of claim 67 wherein said brine has a density of from about 12 to about 17 lb/gal.

174. The drilling fluid system of claim 68 wherein said brine has a density of from about 12 to about 17 lb/gal.

175. The drilling fluid system of claim 69 wherein said brine has a density of from about 12 to about 17 lb/gal.

176. The drilling fluid system of claim 70 wherein said brine has a density of from about 12 to about 17 lb/gal.

177. The drilling fluid system of claim 71 wherein said brine has a density of from about 12 to about 17 lb/gal.

178. The drilling fluid system of claim 72 wherein said brine has a density of from about 12 to about 17 lb/gal.

179. The drilling fluid system of claim 73 wherein said brine has a density of from about 12 to about 17 lb/gal.

180. The drilling fluid system of claim 74 wherein said brine has a density of from about 12 to about 17 lb/gal.

181. The drilling fluid system of claim 75 wherein said brine has a density of from about 12 to about 17 lb/gal.

182. The drilling fluid system of claim 76 wherein said brine has a density of from about 12 to about 17 lb/gal.

183. The drilling fluid system of claim 77 wherein said brine has a density of from about 12 to about 17 lb/gal.

184. The drilling fluid system of claim 78 wherein said brine has a density of from about 12 to about 17 lb/gal.

185. The drilling fluid system of claim 79 wherein said brine has a density of from about 12 to about 17 lb/gal.

186. The drilling fluid system of claim 80 wherein said brine has a density of from about 12 to about 17 lb/gal.

187. The drilling fluid system of claim 84 wherein said brine has a density of from about 12 to about 17 lb/gal.

188. The drilling fluid system of claim 85 wherein said brine has a density of from about 12 to about 17 lb/gal.

189. The drilling fluid system of claim 86 wherein said brine has a density of from about 12 to about 17 lb/gal.

190. The drilling fluid system of claim 90 wherein said brine has a density of from about 12 to about 17 lb/gal.

* * * * *

UNITED STATES PATENT AND TRADEMARK OFFICE
CERTIFICATE OF CORRECTION

PATENT NO.    : 6,403,537 B1
DATED         : June 11, 2002
INVENTOR(S)   : Billy G. Chesser, Charles Perricone and George W. Bettge It is certified that error appears in the above-identified patent and that said Letters Patent is hereby corrected as shown below:

<u>Title page,</u>
Item [57], ABSTRACT, after the word "250°", delete the letter "C" and insert -- F --.

<u>Column 1,</u>
Line 9, after the phrase "drilling fluid" delete the word "system" and insert the word -- systems --.
Line 30, after the word "bottomhole" delete the word "tempt" and insert the word -- temperatures --.
Line 34, before the word "exceeding" insert the word -- temperatures --.

<u>Column 2,</u>
Line 2, delete the word "east" and insert the word -- least --.
Line 50, delete the word "PLUSH" and insert the word -- PLUS --.

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,403,537 B1
DATED : June 11, 2002
INVENTOR(S) : Billy G. Chesser, Charles Perricone and George W. Bettge It is certified that error appears in the above-identified patent and that said Letters Patent is hereby corrected as shown below:

Column 5,
Lines 5, 17-18, 37-38, 43-44 and 55-56, delete "acrylamide monomers to cationic derivatives of acrylamide monomers" and insert -- cationic derivatives of acrylamide monomers to acrylamide monomers --.
Lines 8, 20, 46 and 58, delete "cationic polymer" and insert -- cationic copolymer --.
Lines 29-30 and 66-67, delete "acrylamide monomers to cationic derivatives of said acrylamide monomers" and insert -- cationic derivatives of acrylamide monomers to acrylamide monomers --.

Column 6,
Lines 10-11, delete "acrylamide monomers to cationic derivatives of acrylamide monomers" and insert -- cationic derivatives of acrylamide monomers to acrylamide monomers --.
Lines 13 and 25, delete "cationic polymer" and insert -- cationic copolymer --.
Lines 22-23, delete "acrylamide monomers to cationic derivatives of acrylamide monomers" and insert -- cationic derivatives of acrylamide monomers to acrylamide monomers --.

Column 7,
Lines 16-17, 33-34 and 41-42, delete "acrylamide monomers to cationic derivatives of acrylamide monomers" and insert -- cationic derivatives of acrylamide monomers to acrylamide monomers --.
Lines 18-19 and 42-43, delete "cationic polymer" and insert -- cationic copolymer --.

Column 8,
Lines 38-39, delete "acrylamide monomers to cationic derivatives of said acrylamide monomers" and insert -- cationic derivatives of acrylamide monomers to acrylamide monomers --.
Line 43, delete "cationic polymer" and insert -- cationic copolymer --.

Column 9,
Line 67, delete "cationic polymer" and insert -- cationic copolymer --.

Column 10,
Lines 4, 11, 15, 21, 25, 32, 36, 43, 47, 54, 58 and 65, delete "cationic polymer" and insert -- cationic copolymer --.

Column 11,
Lines 2, 9, 12, 19, 23, 30, 34, 40, 44, 51, 55, 61 and 66, delete "cationic polymer" and insert -- cationic copolymer --.

UNITED STATES PATENT AND TRADEMARK OFFICE
CERTIFICATE OF CORRECTION

PATENT NO.    : 6,403,537 B1
DATED         : June 11, 2002
INVENTOR(S)   : Billy G. Chesser, Charles Perricone and George W. Bettge It is certified that error appears in the above-identified patent and that said Letters Patent is hereby corrected as shown below:

<u>Column 12,</u>
Lines 5, 9, 16, 20, 26, 30, 37 and 41, delete "cationic polymer" and insert -- cationic copolymer --.

Signed and Sealed this

Twentieth Day of May, 2003

JAMES E. ROGAN
*Director of the United States Patent and Trademark Office*